United States Patent [19]
Tristani-Kendra et al.

[11] Patent Number: 5,062,691
[45] Date of Patent: Nov. 5, 1991

[54] LIQUID CRYSTAL DEVICE WITH GREY SCALE

[75] Inventors: Miguel G. Tristani-Kendra; George Papapolymerou, both of St. Paul, Minn.

[73] Assignee: Minnesota Mining and Manufacturing Company, St. Paul, Minn.

[21] Appl. No.: 562,465

[22] Filed: Aug. 3, 1990

Related U.S. Application Data

[63] Continuation-in-part of Ser. No. 428,241, Oct. 27, 1989, abandoned.

[51] Int. Cl.$^5$ .............................................. G02F 1/13
[52] U.S. Cl. ........................................ 359/56; 359/96; 359/99
[58] Field of Search ................ 350/350 S, 333, 350 R, 350/350 F, 349, 347 E, 347 V, 346, 355

[56] References Cited

U.S. PATENT DOCUMENTS

| | | | |
|---|---|---|---|
| 4,367,924 | 1/1983 | Clark et al. | 350/334 |
| 4,563,059 | 1/1986 | Clark et al. | 350/330 |
| 4,818,078 | 4/1989 | Mouri et al. | 350/350 S |
| 4,834,510 | 5/1989 | Fujita | 350/333 |
| 4,840,462 | 6/1989 | Hartmann | 350/333 |
| 4,861,143 | 8/1989 | Yamazaki et al. | 350/341 |
| 4,886,619 | 12/1989 | Janulis | 252/299.1 |

FOREIGN PATENT DOCUMENTS 0360521 3/1990 European Pat. Off. .

OTHER PUBLICATIONS

Lagerwall, S. T., Wahl, J. & Clark, N. A. "Ferroelectric Liquid Crystals for Displays", 1985, Int'l Display Research Conf., pp. 213-221.
Ross, P. W., "720×400 Matrix Ferroelectric Display Operating at Video Frame Rate", 1988 Int'l Display Research Fonf., pp. 185-190.
Hartmann, W. J. A. M., "Ferroelectric Liquid Crystal Video Display", 1988 Int'l Display Research Conf., pp. 191-194.
Clark, N. A., et al., "Modulators, Linear Arrays, and Matrix Arrays Using Ferroelectric Liquid Crystals", Proceedings of Soc. for Information Display vol. 26, 1985, pp. 133-139.
Tomikawa, T., "An identification of Pseudo Continuous Tone by Labeling", Conference Record of the 1988 International Display Research Conf., pp. 146-159.
Leroux, T., et al., "Black and White FLC TV Panel with Grey Lelels", 1988 Int'l Display Research Conf., pp. 111-113.
Ferroelectrics, vol. 76, 1987, pp 221-232 (J. Pavel, M. Glogarova & S. S. Bawa).
Physical Review A, vol. 35, No. 10, May 15, 1987, pp. 4378-4388 (R. J. Cava. J. S. Patel, K. R. Collen, J. W. Goodby, & E. A. Rietman).
Liquid Crystals & Ordered Fluids, ed. Griffin, A. C. et al., 4, 1984, pp. 1-42.

Primary Examiner—Andrew J. James
Assistant Examiner—Sara W. Crane
Attorney, Agent, or Firm—Gary L. Griswold; Walter N. Kirn; Carole Truesdale

[57] ABSTRACT

A ferroelectric liquid crystal device comprising a transparent substrate, an opposed substrate, the substrates disposed to provide a non-helicoidal alignment of the ferroelectric liquid crystal material, a ferroelectric liquid crystal material disposed between the substrates and electrodes on the substrates to define one or a plurality of pixels, each pixel exhibiting controlled continuously variable light transmission as a function of applied field and wherein the molecular orientation of the liquid crystal material is continuously variable and controllable.

9 Claims, 2 Drawing Sheets

LIQUID CRYSTAL DEVICE WITH GREY SCALE

This application is a continuation-in-part of application Ser. No. 07/428,241 filed Oct. 27, 1989, now abandoned.

BACKGROUND OF THE INVENTION

This invention relates to ferroelectric, or tilted chiral smectic, liquid crystal display devices.

U.S. Pat. No. 4,367,924 (Clark et al.) discloses an electro-optical device including a chiral smectic C or H liquid crystal disposed between flat plates treated to enforce molecular orientation parallel to the plates. The plates are spaced by a distance sufficiently small to ensure unwinding of the helix typical in a bulk of the material to form two stable states of the orientation field.

U.S. Pat. No. 4,563,059 (Clark et al.) discloses a liquid crystal device including a ferroelectric liquid crystal disposed between plates treated to enforce a particular ferroelectric molecular orientation to the plates. The devices employ along or in combination non-planar boundary conditions, polar boundary conditions, boundaries with multiple physical states, intrinsic spontaneous splay distortion of the polarization orientation field, combined ferroelectric and dielectric torques, layer tilted with respect to the plates. The plates are spaced by a distance sufficiently small to ensure unwinding of the helix typical in a bulk of the material to form either monostable, bistable or multistable states which exhibit novel electro-optic properties.

U.S. Pat. No. 4,861,143 (Yamazaki et al.) discloses a chiral smectic liquid crystal display having grey scale caused by applying a voltage of an intermediate level. Within each picture element of the display are a number of domains of the liquid crystal layer, some being transparent while the other being opaque rendering grey tone to the picture element. In response to an intermediate voltage, the liquid crystal layer resides in an intermediate condition where some molecules favor the transparent condition and other molecules favor the opaque condition within one picture element. The intermediate condition is stabilized and realizes diverse grades of transmissivity by virtue of fluctuation of the distance between the opposed substrates within one picture element, i.e., by virtue of fluctuation of the electric field applied thereon. In other words, a picture element is sectioned into a plurality of domains having different threshold voltages.

Lagerwall, S. T., Wahl, J., and Clark, N. A., "Ferroelectric Liquid Crystals for Displays", 1985 International Display Research Conference, pp. 213-221, describe liquid crystal devices having grey scale capacity generated by multi-domain, fine grained cell surface structure (space integration) or by switching with different duty ratio (time integration).

Ross, P. W., "720×400 Matrix Ferroelectric Display Operating at Video Frame Rate", 1988 International Display Research Conference, pp. 185-190, discloses that grey scale can be introduced in a ferroelectric display by two methods. One is to split pixels into smaller addressable regions. Such a method requires fine photolithographic geometries and can also increase the required addressing rate if an increase in the number of scanned lines results. An alternative method is to keep simple pixel structures but use repeated addressing within a frame time to vary the duty cycle of light to dark time of the pixel. Ross also discloses that in practice the optimum grey scale technique is likely to be a combination of these spatial and temporal dither techniques.

Hartmann, W. J. A. M., "Ferroelectric Liquid Crystal Video Display", 1988 International Display Research Conference, pp 191-194, describes using a multidomain structure to generate grey scale, whereby, defects are artificially induced by surface preparation techniques.

Clark, N. A., et al., "Modulators, Linear Arrays, and Matrix Arrays Using Ferroelectric Liquid Crystals", Proceedings of Society for Information Display, Vol. 26, 1985, pp. 133-139, describes temporal dither to obtain grey scale. This method turns the device pixels on and off for varying amounts of time, resulting in variable transmitted light energy, which is observed as grey scale. This method complicates the driving scheme for the device and slows down the speed of the display update.

Tomikawa, T. "An Identification of Pseudo Continuous Tone by Labeling", Conference Record of the 1988 International Display Research Conference, pp. 146-151, describes spatial dither to obtain grey scale. This method breaks a super pixel into much smaller independently addressable areas. By turning on varying numbers of these smaller elements, grey scale is achieved. This method complicates the device by increasing the number of display elements that need to be addressed.

Leroux, T., et al., "Black and White FLC TV Panel with Grey Levels", 1988 International Display Research Conference, pp. 111-113, discloses a ferroelectric liquid crystal TV panel with grey levels achieved using a combination of multidomain switching, time integration, and space integration. This is a compromise between the spatial method which requires a large number of connectors for the large number of sub-pixels, and the temporal method which requires extremely fast liquid crystal material response times.

SUMMARY OF THE INVENTION

Figure 1:
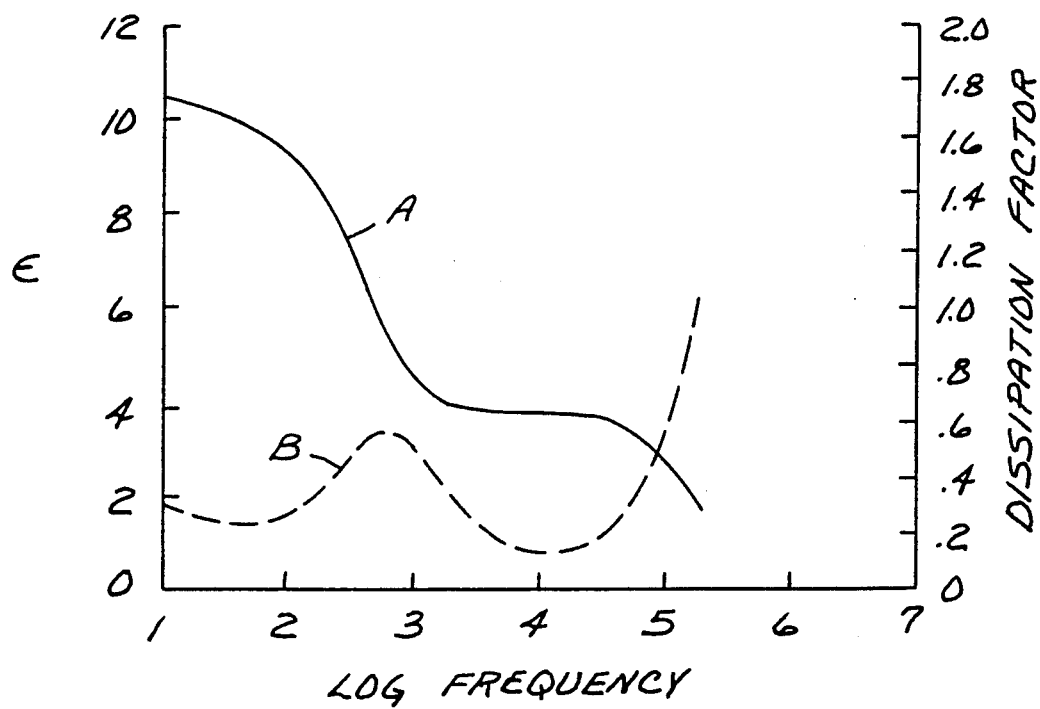
FIG. 1 is a plot of dielectric constant and dissipation factor against frequency for a device of the present invention.

The present invention relates to a ferroelectric liquid crystal device comprising a transparent substrate, an opposed substrate, said substrates disposed to provide a non-helicoidal alignment of the ferroelectric liquid crystal material, a ferroelectric liquid crystal material disposed between said substrates and electrodes on said substrates to define one or a plurality of pixels, each said pixel exhibiting controlled continuously variable light transmission (continuous grey scale) as a function of applied field and wherein the molecular orientation of the liquid crystal material is continuously variable and controllable.

The liquid crystal devices of the invention can have the fast response times of the bi-stable devices while allowing continuously variable grey scale light transmission, the response time varying as a function of the level of greyness activated. The liquid crystal devices of the invention are useful in a variety of electrooptical applications, including but not limited to, switching elements in liquid crystal displays, optical shutters, and optical shutter arrays. The present invention provides a grey scale device which is not dependent upon intentional but uncontrollable defect inclusion, complex time multiplexing, complex device construction, or difficult wiring and addressing schemes for large number of sub-pixels.

DETAILED DESCRIPTION OF THE INVENTION

Ferroelectric liquid crystal devices such as described by Clark et al. in U.S. Pats. No. 4,363,059 and No. 4,367,924, are generally bi-stable or two level devices. As such, they are unsuitable for the display of image information requiring more than two levels, such as in a visual display or printer output requiring tonal gradation to produce visually appealing images The disadvantage of two level devices is that being binary in nature, each picture element, or pixel, is either wholly transmitting or absorbing. Thus, the generation of tonal gradation requires extra-ordinary measures, such as spatial or temporal dither.

The past efforts to provide a ferroelectric liquid crystal grey scale device have all been aimed at using the two-state devices in various schemes to produce a tonal gradation. It would be of particular advantage to construct a device which would exhibit a transmission modulation directly proportional to the magnitude of the input voltage, similar to what is possible with a nematic liquid crystal device, but with the speed of a ferroelectric liquid crystal device. This would allow the transmission of light to be continuously variable throughout the range of transmission available from the device.

The present invention provides such a device which is capable of producing an infinite number of levels of tonal gradation. Generally it is recognized that the slope of the transmission curve for any image can be divided into a series of step levels of grey, and generally these steps are multiples of 4, 8, 16, 32, 64, 128, and 256. The higher the number of levels, the more accurate the image produced. The device of the present invention having an infinite number of levels, is therefore capable of producing very highly accurate images. An additional alternative would be to use the present invention in combination with spatial or temporal dither.

In a surface stabilized device of the prior art, the liquid crystal molecules exist in either of two states in their lowest energy configuration, and both states can be accessed by the polarity of the applied field. This is accomplished by using an alignment layer on one or both of the substrates (or boundary plane) and making the spacing of the substrates of the cell less than the chiral pitch length of the liquid crystal molecule, so that the surface forces can completely unwind the molecular chiral helix.

The fixed molecular tilt angle and the boundary plane of the substrate, dictate that there are two possible configurations of the molecules. In one configuration the polarization vector points towards one boundary plane, and in the other configuration, the polarization vector points towards the other boundary plane. These two states are the bi-stable states of the device. The application of an electric field across to the device, will switch liquid crystal molecules from one state to the other, but the molecules will always seek their lowest energy configuration. With the molecular helixes unwound, the molecular movement from one state to another is along a path described by a cone with the apex and center line parallel to the smectic layer normal. The two stable states of the molecule are at either low energy site on this cone.

When a voltage is applied across any liquid crystal device, the liquid crystal material within the device experiences electric field forces from two sources. One force, from the spontaneous polarization is proportional to $\bar{P} \cdot e, \text{rar}/E/$, and is linear with the electric field, and a second force arising from the anisotropy in the dielectric permittivity, $\Delta \epsilon E^2$ which varies quadradically with the electric field. In the above expressions, P is the polarization, $\Delta \epsilon$ is the dielectric anisotropy of the liquid crystal material, and E is the electric field developed across the device as a result of the applied voltage. Depending on the material used and the molecular geometry, these two terms can act in a complementary manner, can oppose one another, or one term can dominate the other. One extreme is nematic liquid crystal materials in which only the $\Delta \epsilon E^2$ term is present and grey scale is always possible. In the ferroelectric devices and materials heretofore known, the $\bar{P} \cdot e, \text{rar}/E/$ term was the dominating one, and bi-stable switching occurred.

In the present invention, it has been discovered that the proper choice of materials, usually those in which the $\bar{P} \cdot e, \text{rar}/E/$ term contributes less to the force on the molecules than the $\Delta \epsilon E^2$ term, results in a device with the attribute of high speed switching normally expected with ferroelectrics, accompanied by the desirable continuous grey scale optical transmission.

As with ferroelectric bi-stable devices, it is necessary for the device of the present invention to be thin enough to allow the surface forces created by the alignment layer to completely unwind the molecular chiral helix, thus providing a non-helicoidal alignment. With the molecular helixes unwound the molecular movement is along a path described by a cone as in the bi-stable device. However, in the present invention the molecular movement is controllable and continuously variable along that cone by varying the electric field across the device.

It has been found that for a liquid crystal device of the present invention, the liquid crystal material contained therein must show a change in the dielectric constant with a change in the bias voltage, which is manifest in the device showing a capacitance change with applied bias voltage. The dielectric response is frequency dependent and the distinction between materials that exhibit a grey scale effect and those that do not is usually evident at frequencies below 10 KHz where effects due to the polarization of chiral smectic C* materials are often found. In materials with a significant polarization, a peak in the dissipation factor is often found below 10 KHz. The frequency of the occurrence of the peak in dissipation factor, or one below that, is convenient to choose for the dielectric measurement versus bias. A generalized plot of dielectric constant, curve A, and dissipation factor, curve B, versus frequency is shown in FIG. 1.

The liquid crystal materials found most advantageous for use in the present invention are fluorinated chiral liquid crystal materials such as described in U.S. Pat. No. 4,886,619 (Janulis) which is incorporated herein by reference. These materials can be used by themselves or in mixtures with other fluorinated chiral or achiral materials or hydrocarbon materials.

Figure 2:
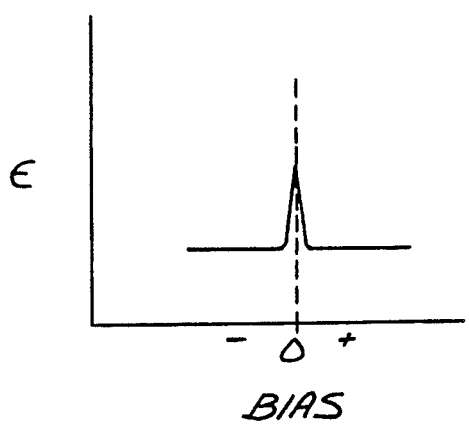
FIGS. 2 and 3 are plots of dielectric constant against bias field for prior art devices.
Figure 3:
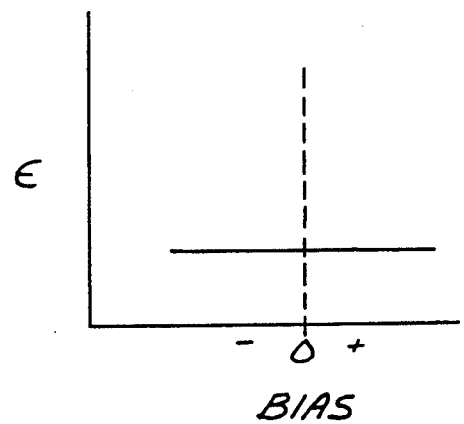

It is instructive to look at the dielectric behavior of materials that do not exhibit greyscale first. Two plots of dielectric constant versus bias field are shown for a device containing a liquid crystal mixture having a polarization of 5 nC/cm2 (FIG. 2) and for a device containing a liquid crystal mixture having a polarization of less than 1 nC/cm2 (FIG. 3), measured at a frequency below 10 KHz.

Both materials show very little change in dielectric constant at high bias field, but a spike is found in the mixture with a polarization of 5 nC/cm2 near zero volts/micron bias. The dielectric constant is measured by an impedance meter using a 1 volt AC signal. Near zero volts/micron bias, the AC signal may be enough to reorient the molecules about the aforementioned cone, in the case of the higher polarization material. It has been shown in Ferroelectrics, Vol. 76, 1987, pp 221-232 (J. Pavel, M. Glogarova, and S. S. Bawa), that application of a biasing field to a planar smectic C* sample can suppress all contributions to the dielectric constant due to polarization changes, and lead to a decrease in the dielectric constant. In low polarization materials, there is little contribution of polarization changes to the dielectric constant at any bias field.

Figure 4:
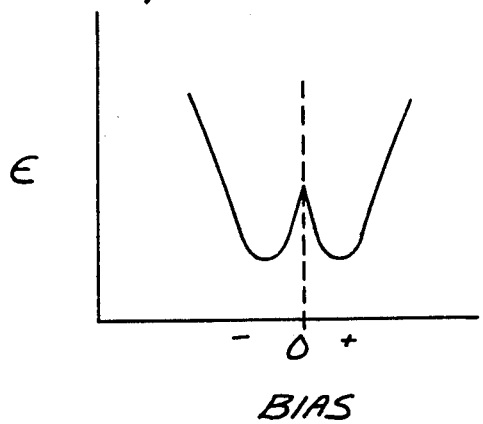
FIGS. 4 and 5 are plots of dielectric constant against bias field for devices of the invention.
Figure 5:
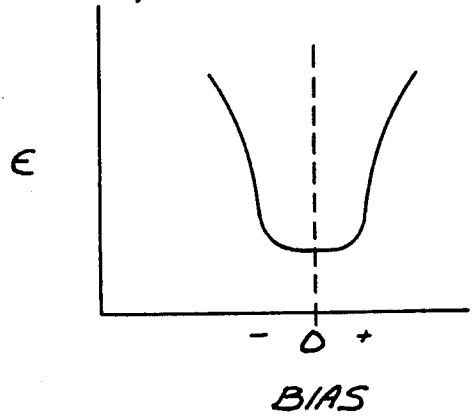

In contrast, FIG. 4, and FIG. 5 are plots of dielectric constant versus bias field for devices containing liquid crystal materials that exhibit grey scale.

The measurements are made at a frequency below 10 KHz and the plot of FIG. 4, shows a device where the polarization of the material is about 3 nC/cm2, while FIG. 5, shows a device with material having polarization of less than 1 nC/cm2. As with the device in which the mixture does not exhibit grey scale, the higher polarization material shows a spike in the dielectric constant versus bias near zero volts/micron bias, presumably for the same reason. As the bias is increased from zero volts/micron, the dielectric constant drops to a minimum value, just as in the device which does not exhibit grey scale. However, in the devices of the present invention as the bias is increased further, either positively or negatively, a large change in dielectric constant is observed.

A useful device of the present invention contains liquid crystal materials which show a change in the dielectric constant of at least 5% for a change in bias voltage of up to +/−15 volts/micron. The measurement is made at a frequency where polarization effects of the chiral smectic C* material are likely to be found (generally less than 10 KHz). In addition, dielectric constant changes are only considered after a high enough bias has been applied to remove polarization effects which are usually found near zero volts/micron bias. It has been found that the larger the change in dielectric constant versus bias, the more pronounced is the change in optical transmission or grey scale of the device. Also, the steeper the change in dielectric constant versus bias curve, the more sensitive the optical transmission of the device is to changes in applied field.

Devices which do not exhibit greyscale contained materials which have shown less than 5% change in dielectric constant with up to a 15 volt/micron change in bias. The dielectric change is in a bias region, away from the zero volts/micron spike, if present.

The device of the present invention comprises two opposing substrates, one of which is optically transparent. The inward facing surfaces of each substrate contain electrically conductive electrodes in a configuration to produce a desired pattern, the electrode on the transparent electrode also being transparent. The electrodes may be of any electrically conductive material, a common one being indium tin oxide, and may be applied by methods commonly known in the art. At least one of the substrates has thereon an alignment layer to orient the enclosed liquid crystal material. This alignment layer can be produced by any of the methods known in the art, including coatings of polymers followed by buffing, applications of stretched oriented polymer films, or by deposition of various inorganic materials. The opposed substrates are disposed a small distance apart with spacers, said distance, along with the alignment layer, allows for the non-helicoidal alignment of the included liquid crystal material. The so produced device is then filled with a liquid crystal material which shows a change in dielectric constant with bias voltage as heretofore described, sealed on its edges and the electrodes connected to an appropriate electrical driving source. As the driving source voltage is varied, the field across the device changes and this changing field causes the liquid crystal molecules to align in a continuously variable and controlled manner, thus producing a device with continuously variable and controlled grey scale.

The devices of the present invention can be, for example, in the form of transmissive devices where the opposed substrate is transparent, reflective devices where the opposed substrate is reflective, and devices using dyes mixed with the ferroelectric liquid crystal material which exhibit the guest-host effect, all of which are well-known to those skilled in the art.

In each of the following examples, a liquid crystal cell was constructed from two borosilicate glass plates, 0.048 inches thick by 1.135×1.375 inches wide and long. One surface of each glass plate was coated with a 400 A coating of a transparent and electrically conductive layer of indium tin oxide, and subsequently etched using standard photo-lithography techniques, to create a single ITO electrode of 9.5 mm by 16.5 mm on each glass plate. One of the electrodes for each cell was then coated with an alignment layer of 400 A thick film of nylon. The nylon was applied by spin coating from a 0.5% solution of nylon in a concentrated aqueous formic acid solution. This applied nylon coating was then rubbed in one direction using a velvet cloth. The plates were assembled with the surfaces containing the electrodes, facing and parallel to each other, in such a way that the two electrodes would intersect to form a 9.5 mm by 9.5 mm pixel. The plates were pressed together and held a distance of 2 to 3 microns apart by standard photoresist spacer bars of 1×40 mm width and length, thus producing a thin cell which assured a non-helicoidal alignment of the molecules in the Smectic C* phase of the materials tested. The assembly was then sealed around the edges with a UV curable epoxy (Norland #91). Just prior to final sealing, each cell was filled with the liquid crystal material of the example, by a standard filling technique utilizing capillary action.

The cells of each example were tested using the following procedure. The electrodes of the cell were connected to a 50 Hz square wave oscillator with variable output voltage. Optical transmission was measured by placing the cell between two crossed polarizers on an optical bench, with the polarizer/cell combination placed between a collimated HeNe light beam of about 9 mW intensity and about 3 mm in diameter, and a silicon photodetector, the output of which was monitored on an oscilloscope. The cell was aligned, at low field, in such a way that the best extinction was obtained for one polarity of the field. The photoresponse was displayed on the oscilloscope and the voltage level at a fixed point relative to the oscilloscope trigger during the transmission maximum was monitored. The magnitude of the square wave voltage was varied and the maximum transmission measured.

The conductance and susceptance of each device was measured versus frequency using a 4192A impedance meter, available from Hewlett Packard Company, similar to the measurement technique described in Physical Review A, Vol. 35, No. 10, May 15, 1987, pp 4378–4388 (R. J. Cava, J. S. Patel, K. R. Collen, J. W. Goodby, and E. A. Rietman). The cell thickness was used to calculate the dielectric constant and the dissipation factor vs frequency. The dielectric constant and dissipation factor were also measured vs bias field (by measuring the conductance and susceptance) in a similar manner to that set forth in *Ferroelectrics*, Vol. 76, 1987, pp. 221–232 (J. Pavel, M. Glogarova, and S. S. Bawa).

The fluorinated chiral liquid crystal compounds used in the examples were made as described in U.S. Pat. No. 4,886,619. The fluorinated non-chiral liquid crystal compounds used in the examples were made as described in European Patent Publication No. 0 360 521, and the hydrocarbon liquid materials used in the examples were made as described in Liquid Crystals and Ordered Fluids, ed. Griffin, A. C. et al., 4, 1984, pp. 1–42.

EXAMPLE 1

A cell was prepared and filled with a liquid crystal multi-component mixture of 4.6 wt. % of 4-(4-(1,1-dihydroperfluorobutoxy)benzoyloxy)phenyl (R)-2-fluoropropanoate, 3.2% 1,1-dihydroperfluorobutyl 2-chloro-4-(4-octyloxybenzoyloxy)benzoate, 7.0% of 4-(1,1-dihydroperfluorohexyloxy)phenyl 6-decyloxynicotinoate, 7.1% of 4-(1,1-dihydroperfluorobutoxy)phenyl 4-octyloxybenzoate, 8.9% of 4-(1,1-dihydroperfluorohexyloxy)phenyl 4-octyloxybenzoate, 8.0% of 4-octyloxyphenyl 4-(1,1-dihydroperfluorobutoxy)benzoate, 9.4% of 1,1-dihydroperfluorobutyl 4-(4-octyloxybenzoyloxy)benzoate, 25.6% of 1,1-dihydroperfluorobutyl 4-(4-decyloxybenzoyloxy)benzoate, and 26.1% of 4-decyloxyphenyl 3-chloro-4-(1,1-dihydroperfluorohexyloxy)benzoate. Dielectric constant measurements verses bias field taken at 0.1 KHz are shown in Table 1.

TABLE 1

| Dielectric Constant | Volts/micron | % Change in Dielectric Constant |
|---|---|---|
| 6.62 | 2.40 | — |
| 8.75 | 9.62 | 32 |
| 9.12 | 16.83 | 38 |

Figure 6:
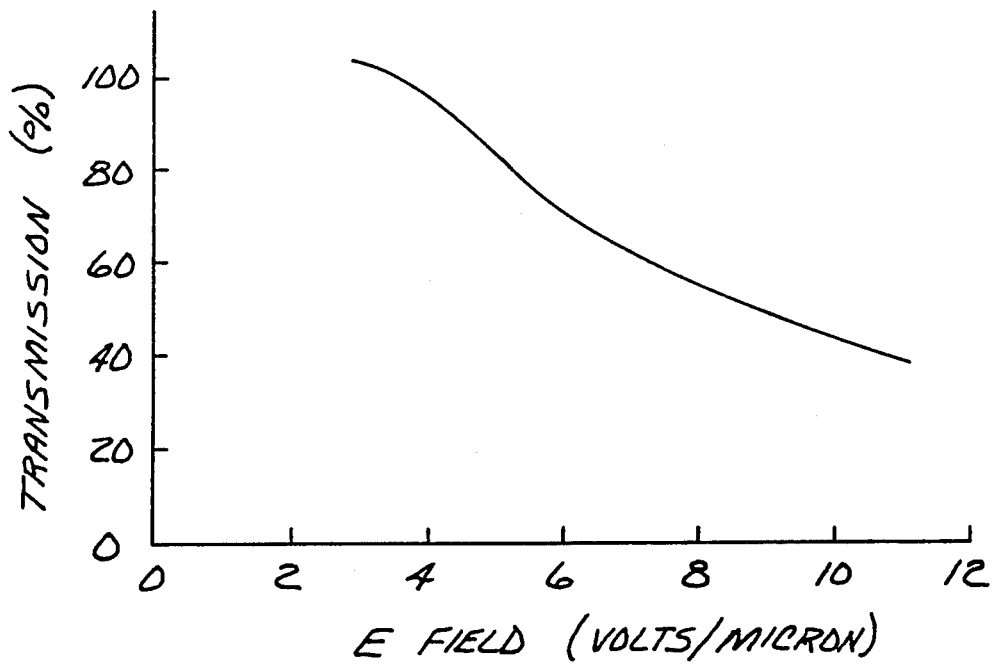
FIG. 6 is a plot of optical transmission against applied electric field for the device of Example 1.

Optical transmission versus applied electric field was found to be as shown in FIG. 6. Since this transmission is controllable with the applied electric field, the cell is an example of a controlled grey scale liquid crystal device.

EXAMPLE 2

A device was prepared and filled with liquid crystal 4-(1,1-dihydroperfluorobutoxy)phenyl (S)-4-(4-methylhexyloxy)benzoate. Dielectric constant measurements versus bias field taken at 1 KHz are shown in Table 2.

TABLE 2

| Dielectric Constant | Volts/micron | % Change in Dielectric Constant |
|---|---|---|
| 5.98 | 0 | — |
| 6.73 | 1.79 | 12 |
| 9.03 | 3.57 | 51 |
| 13.45 | 7.14 | 125 |

Optical transmission versus applied electric field indicated a device with the desired controlled grey scale effect.

EXAMPLE 3

A device was prepared and filled with a liquid crystal 1,1-dihydroperfluorobutyl (S)-4-(4-(4-methylhexyloxy)benzoyloxy)benzoate. Dielectric constant measurements versus bias field taken at 1 KHz are shown in Table 3.

TABLE 3

| Dielectric Constant | Volts/micron | % Change in Dielectric Constant |
|---|---|---|
| 6.32 | 0 | — |
| 6.32 | 2.03 | 0 |
| 6.76 | 4.06 | 7 |
| 9.22 | 8.13 | 46 |

Optical transmission versus applied electric field indicated the device to have the desired controlled grey scale effect.

EXAMPLE 4

A device was prepared and filled with a liquid crystal mixture of 52.8 wt. % of 2-(4-octyloxyphenyl)-5-decylprimidine and 47.2 wt. % of 4-(1,1-dihydroperfluorobutoxy)phenyl (S)-4-(4-methylhexyloxy)benzoate. Dielectric constant measurements versus bias field taken at 1 KHz are shown in Table 4.

TABLE 4

| Dielectric Constant | Volts/micron | % Change in Dielectric Constant |
|---|---|---|
| 4.85 | 0.39 | — |
| 5.20 | 1.94 | 7 |
| 7.07 | 3.88 | 46 |
| 7.65 | 7.75 | 58 |
| 7.97 | 13.57 | 64 |

Optical transmission versus applied electric field indicated the device to have the desired controlled greyscale effect.

EXAMPLE 5

A device was prepared and filled with a liquid crystal mixture of 81.6 wt. % of 4-(1,1-dihydroperfluorobutoxy)phenyl 4-oxtyloxybenzoate and 18.4 wt. % of (S)-2-methylbutyl 4-(4-octyloxybenzoyloxy)benzoate. Dielectric constant measurements versus bias field taken at 0.1 KHz are shown in Table 5.

TABLE 5

| Dielectric Constant | Volts/micron | % Change in Dielectric Constant |
|---|---|---|
| 8.57 | 2.03 | — |
| 9.36 | 4.06 | 9 |
| 12.35 | 8.13 | 44 |

TABLE 5-continued

| Dielectric Constant | Volts/micron | % Change in Dielectric Constant |
|---|---|---|
| 12.67 | 14.23 | 48 |

Optical transmission versus applied electric field indicated the device to have the desired controlled greyscale effect.

EXAMPLE 6

A device was prepared and filled with a liquid crystal mixture of 90.7 wt. % of 4-(1,1-dihydroperfluorobutoxy)phenyl (S)-4-(4-methylhexyloxy)benzoate and 9.3 wt. % of 4-(4-(1,1-dihydroperfluorobutoxy)benzoyloxy)-phenyl (S)-2-chloro-4-methylpentanoate. Dielectric constant measurements versus bias field taken at 1 KHz are shown in Table 6.

TABLE 6

| Dielectric Constant | Volts/micron | % Change in Dielectric Constant |
|---|---|---|
| 8.25 | 2.27 | — |
| 9.14 | 4.54 | 11 |
| 11.99 | 9.09 | 45 |

Optical transmission versus applied electric field indicated the device to have the desired controlled greyscale effect.

EXAMPLE 7 (Comparative)

A device was prepared and filled with (S)-2-methylbutyl 4-(4-octyloxybenzoyloxy)benzoate. Dielectric constant measurements versus bias field taken at 0.355 KHz are shown in Table 7.

TABLE 7

| Dielectric Constant | Volts/micron | % Change in Dielectric Constant |
|---|---|---|
| 8.16 | 3.56 | — |
| 8.15 | 7.91 | <.2 |
| 8.16 | 13.83 | 0 |

Optical transmission versus applied electric field indicated the device did not have the desired controlled greyscale effect.

EXAMPLE 8 (Comparative)

A device was prepared and filled with SCE13 a commercial ferroelectric hydrocarbon mixture from BDH Chemical of Poole, England. Dielectric constant measurements versus bias field taken at 0.1 KHz are shown in Table 8.

TABLE 8

| Dielectric Constant | Volts/micron | % Change in Dielectric Constant |
|---|---|---|
| 5.60 | 3.84 | — |
| 5.56 | 7.69 | 0.7 |
| 5.52 | 13.46 | 1.4 |

Optical transmission versus applied electric field indicated the device did not have the desired controlled grey scale effect.

EXAMPLE 9 (Comparative)

A device was prepared and filled with ZLI-3041 a commercial ferroelectric hydrocarbon mixture from EM Industries an Associate of E. Merck of Darmstadt, West Germany. Dielectric constant measurements versus bias field taken at 0.631 KHz are shown in Table 9.

TABLE 9

| Dielectric Constant | Volts/micron | % Change in Dielectric Constant |
|---|---|---|
| 3.85 | 4 | — |
| 3.83 | 5.2 | .5 |
| 3.81 | 8 | 1 |

Optical transmission versus applied electric field indicated the device did not have the desired controlled greyscale effect.

EXAMPLE 10 (Comparative)

A device was prepared and filled with a liquid crystal mixture of 5 wt. % of (S)-4-(4-methylhexyloxy)phenyl 4-hexyloxybenzoate and 95 wt. % of 2-(4-octyloxyphenyl)-5-decylprimidine. Dielectric constant measurements versus bias field taken at 1 KHz are shown in Table 10.

TABLE 10

| Dielectric Constant | Volts/micron | % Change in Dielectric Constant |
|---|---|---|
| 3.30 | 0 | — |
| 3.30 | 2 | 0 |
| 3.30 | 4 | 0 |
| 3.32 | 8 | 0.6 |
| 3.44 | 14 | 4 |

Optical transmission versus applied electric field indicated the device did not have the desired controlled greyscale effect.

What is claimed is:

1. A ferroelectric liquid crystal device comprising a transparent substrate, an opposed substrate, said substrates disposed to provide a non-helicoidal alignment of the ferroelectric liquid crystal material, a ferroelectric liquid crystal material disposed between said substrates and electrodes on said substrates to define one or a plurality of pixels, each said pixel exhibiting controlled continuously variable light transmission as a function of applied field and wherein the molecular orientation of the liquid crystal material is continuously variable and controllable.

2. The device of claim 1 wherein said device exhibits a change in capacitance with a change in bias voltage.

3. The device of claim 1 wherein said device exhibits a change in the capacitance of at least 5% for a change in bias voltage of up to +/−15 volts/micron after a sufficiently high bias has been applied to remove polarization effects.

4. The device of claim 1 wherein said electrodes are of indium tin oxide.

5. The device of claim 1 wherein at least one of said substrates has an alignment layer applied thereon.

6. The device of claim 1 wherein said ferroelectric liquid crystal material is fluorinated.

7. The device of claim 1 wherein said opposed substrate is transparent.

8. The device of claim 1 wherein said opposed substrate is reflective.

9. The device of claim 1 wherein said device further comprises a dye disposed between said substrates, said ferroelectric liquid crystal material and said dye exhibiting the guest-host effect.

* * * * *

UNITED STATES PATENT AND TRADEMARK OFFICE
CERTIFICATE OF CORRECTION

PATENT NO. : 5,062,691

DATED : November 5, 1991

INVENTOR(S) : Miguel G. Tristani-Kendra and George Papapolymerou

It is certified that error appears in the above-identified patent and that said Letters Patent is hereby corrected as shown below:

Col. 4, lines 12, 25 and 30  "$\vec{P}\cdot e,rar/E/$" should read -- $\vec{P}\cdot\vec{E}$ --

Col. 5, lines 7, 9, 13, 32 & 34  "nC/cm2" should read -- $nC/cm^2$ --

Signed and Sealed this

Ninth Day of March, 1993

Attest:

STEPHEN G. KUNIN

Attesting Officer    Acting Commissioner of Patents and Trademarks